Dec. 22, 1970

J. L. KLINCK 3,548,586

COMPOSITE BALANCE WHEEL CONSTRUCTION FOR
ELECTRIC TIMEKEEPING DEVICES

Filed Oct. 1, 1968

INVENTOR
JOHN L. KLINCK

BY
*LeBlanc & Shur*
ATTORNEYS

Dec. 22, 1970  J. L. KLINCK  3,548,586
COMPOSITE BALANCE WHEEL CONSTRUCTION FOR
ELECTRIC TIMEKEEPING DEVICES
Filed Oct. 1, 1968

INVENTOR
JOHN L. KLINCK

BY
*LeBlanc & Shur*
ATTORNEYS

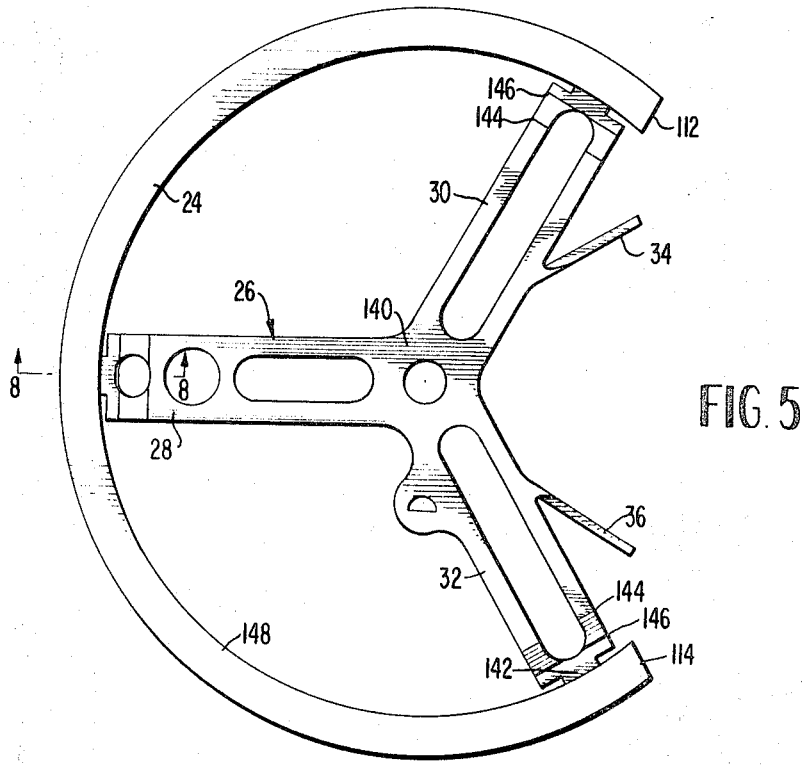
FIG. 5
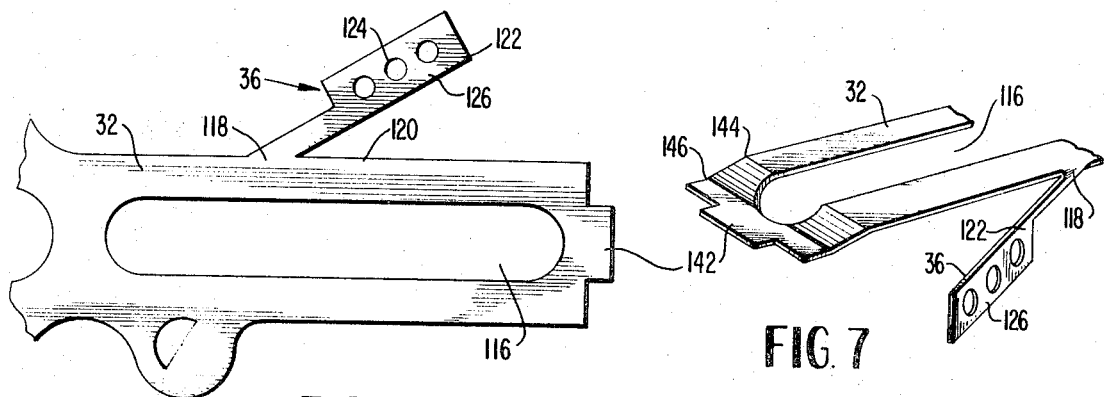
FIG. 6
FIG. 7
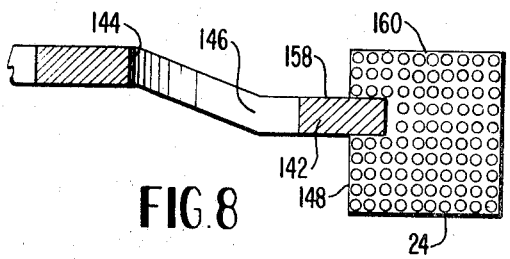
FIG. 8
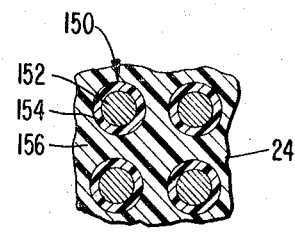
FIG. 9
INVENTOR
JOHN L. KLINCK
BY
Le Blanc & Shur
ATTORNEYS United States Patent Office 3,548,586
Patented Dec. 22, 1970

3,548,586
COMPOSITE BALANCE WHEEL CONSTRUCTION
FOR ELECTRIC TIMEKEEPING DEVICES
John L. Klinck, Lancaster, Pa., assignor to Hamilton
Watch Company, Inc., Lancaster, Pa., a corporation of
Pennsylvania
Filed Oct. 1, 1968, Ser. No. 764,172
Int. Cl. G04c 3/04
U.S. Cl. 58—28                                  26 Claims

ABSTRACT OF THE DISCLOSURE

There is disclosed herein a composite balance wheel structure including an arm and rim formed by winding onto the arm a coil of insulated wire of predetermined characteristics and coated with a liquid resinous binder which is cured to form a rigid integral unit. A significant result of this construction is production of a balance wheel with low eddy current losses, but which retains other desirable properties such as high moment of inertia to mass ratio necessary for accurate timekeeping.

---

The present invention relates to the design and construction of improved balance wheels for electric timekeeping devices having low eddy current losses.

Balance wheels constructed in accordance with this invention are intended for use in electric watches, clocks, timers, etc. having a hair-spring regulated balance wheel driven by the interaction of a magnetic field and a current carrying drive coil. An example of such a timekeeping device may be found in the electric wrist watches shown in assignee's U.S. Pat. No. Re. 26,187, reissued Apr. 4, 1967 to John A. Van Horn et al. for Electric Watch.

In timekeeping devices of the type in question, the above-mentioned drive coil is usually mounted on the balance wheel and is positioned to pass through the magnetic field produced by one or more permanent magnets. An electrical contact system having a first member mounted on the balance wheel and a second member fixed relative to the balance wheel connects the coil to a source of power, e.g., a battery. The coil is intermittently energized as it passes through the magnetic field whereby a force is applied to the coil due to the interaction between the field and the current in the coil. The force is transmitted to the balance wheel and serves to sustain balance wheel oscillation at a frequency determined by the mechanical characteristics of the hair spring balance wheel system. An indexing system converts the oscillation of the balance wheel into the unidirectional motion which may then be utilized for timekeeping or other timing purposes.

In timekeeping devices as described above, especially in wristwatches where size is a critical factor, some arrangement for limiting the coil current is essential to permit the use of a battery of realistic size and with sufficiently long lifetime to avoid the inconvenience of frequent replacement. Therefore, in current electric watches, power is conserved by every available means. These include arrangement of the contact system to provide only intermittent energization of the coil, as previously described. In this way, current flows through the coil only when the coil is actually passing through the magnetic field since this is the only time that the driving force can be applied to the balance wheel. Further, considerable effort in design and manufacture is made to assure that the balance mechanism will operate with a minimum of frictional and other mechanical losses thereby further reducing the energy necessary to sustain balance wheel oscillation.

In the course of such effort it has been recognized that the energy necessary to sustain balance wheel oscillation depends to a significant degree on the extent of braking effects due to eddy current generated magnetic fields in the balance wheel. As is known, local velocity dependent electric currents are generated in conductive materials passing through a nonuniform magnetic field which tend to oppose the motion of the conductor. This results in net reduction in the effective force applied to the balance wheel or conversely, increases the coil current required to sustain oscillation with a given magnetic field.

Several approaches have been investigated for minimizing the extent and effect of these eddy currents. In most instances, however, significant difficulties have been encountered.

For example, it is well known that a high ratio of moment of inertia to mass is quite desirable for accurate timekeeping. This requirement is normally met by concentration of most of the balance wheel material near the rim or periphery. Thus, a straightforward approach to reducing eddy currents would be to position the magnets in such a manner that the resulting magnetic fields do not extend into the region of the balance wheel rim.

On the other hand, it will be appreciated that a given magnetic force applied to the balance wheel at a large radius is relatively more effective in transferring energy than the same force applied at a smaller radius. Conversely, since the magnetic force is directly proportional to the current in the coil, placement of the magnets and the coil at a large radius, i.e., near the rim of the balance wheel, allows use of a smaller current to maintain the balance wheel oscillation. Thus, it may be seen that the straightforward approach of positioning the balance wheel rim outside of the magnetic field may not be entirely satisfactory.

Alternatively, it will be recalled that the intensity of the eddy currents depends in part on the velocity of the conductor as it passes through the magnetic field. By appropriate selection of the balance wheel configuration, it may be possible to produce a structure in which the portions most prone to eddy current generation, e.g., those having large areas of conductive material, pass through the magnetic field while the balance wheel is traveling at a relatively low velocity while the portions passing through the field at high velocity present a relatively small conductive area to the magnetic field. Such technique may be desirable from the point of view of reducing eddy current losses, but it may also prove to be impractical due to the requirement for a high moment of inertia to mass ratio. In other words, if the balance wheel is constructed in such a manner that the portions passing through the magnetic field at high velocity are not prone to eddy current generation, the result may well be a construction with an insufficient moment of inertia to mass ratio for satisfactory operation.

Yet another approach would be to construct a balance wheel out of a nonconductive, i.e., nonmetallic material. This, however, would require a high density material to meet the requirement that the balance wheel possess a high moment of inertia to mass ratio. In addition, nonmetallic materials having high strength and hardness, low coefficient of thermal expansion, etc. would be necessary to assure structural integrity. Considerable difficulty has been encountered in obtaining a material meeting these requirements. Moreover, practical difficulties in fabrication have been encountered.

According to this invention, a new and improved balance wheel has been designed and constructed to provide a construction characterized by low eddy current loss while resolving the seemingly conflicting requirements of high moment of inertia to mass ratio, high energy coupling efficiency, structural integrity, and relative ease of fabrication.

As a principal feature of this invention, the new and improved balance wheel is of composite construction having a central arm structure of a particular design and a wire wound rim formed of a coil of fine conductive wires insulated from each other and secured together and attached to the balance wheel arm with a body of resinous or other suitable material to form an integral structure. A segment of the wire wound rim is removed and replaced by a separate coil of wire mounted on the balance wheel arm and connected by a suitable set of electrical contacts to the power source for the device.

The wire wound rim is formed of a conductive metal of high density and low magnetic impurity content as well as high tensile strength and hardness. Use of a material having the required properties, as well as the configuration of the balance wheel, permits concentration of the majority of the balance wheel weight in the rim, and at the same time permits disposition of the current carrying coil at a high radius without incurring difficulties due to high eddy current braking effects.

In addition, to the relative immunity to eddy current braking of the present construction, it is possible to design the balance wheel without concern for its weight distribution relative to speed of passage through the magnetic field. Moreover, the present construction possesses the requisite structural integrity and relative ease of fabrication and yet is subject to a maximum magnetic loss of about 2 ergs per second for 1.08 turns of motion.

An additional principal feature of this invention resides in the development of a technique for fabrication of the new and improved balance wheel described above. Specifically, the technique employed is a wet winding process wherein insulated wire of the proper diameter is precoated with a resinous binder and wound under tension on a suitable bobbin to form the wire wound rim. According to this invention, a preformed balance wheel arm is mounted in the bobbin with suitable attachment tabs extending into the area in which the coil is to be wound so that the tabs, and therefore the balance wheel arm itself, is "wound into" the rim while the rim is being formed. The wire wound rim and arm are then semi-cured by heat treatment to bind the entire structure into an integral unit. Then, a segment of the rim is removed and a further heat treatment is applied after which the energizing coil and contact structure is attached.

The foregoing structure and fabrication technique has been found to be extremely valuable in producing a balance wheel having the required low eddy current loss and at the same time meeting the other requirements for successful balance wheel construction. The fabrication technique employed is efficient and economically satisfactory and conveniently produces a balance wheel having the structural integrity necessary for successful operation.

Accordingly, it is an object of this invention to provide a new and improved balance wheel construction for electric timekeeping devices.

It is an additional object of this invention to provide such a new and improved balance wheel construction characterized by lower eddy current losses in operation than in heretofore available constructions.

It is another object of this invention to provide a new and improved balance wheel construction providing low eddy current losses while retaining other features necessary for successful timekeeping operation.

It is a related object of this invention to provide the aforementioned results with a balance wheel having a conductive rim formed of a series of concentric open loops electrically isolated from each other defining a generally circular balance wheel periphery.

It is a further object of this invention to provide a composite balance wheel formed of an arm structure having predetermined properties and configuration and a composite wire wound rim formed of a coil of fine conductive insulated wire attached to the balance wheel arm and bonded together into an integral unitary structure.

It is another object of this invention to provide a composite balance wheel as described above having a maximum magnetic loss of about 2 ergs per second at 1.08 turns of motion.

An additional object of this invention is to provide a balance wheel characterized by low eddy current losses, yet having a satisfactorily high moment of inertia to mass ratio.

It is a further object of this invention to provide a method for fabricating the new and improved balance wheel for an electric timekeeping device.

It is further an object of this invention to provide a method for manufacturing a balance wheel for a timekeeping device in which a balance wheel rim is formed by winding a preformed balance wheel arm into a wire coil, followed by removal of a predetermined portion of the coil and mounting of an energizing coil in place of the removed segment.

It is also an object of this invention to provide a method for fabricating a balance wheel as described above including appropriate heat treatment steps to assure structural integrity and dimensional stability for the finished product.

The exact nature of this invention, as well as other objects and advantages thereof, will become apparent from consideration of the following detailed description and the accompanying drawings in which:

FIG. 5 is a top plan view of the balance wheel with the hairspring, drive coil and contact system removed;

FIG. 6 is a fragmentary view of one spoke of the balance wheel arm;

FIG. 7 is a perspective view of a drive coil mounting tab after preparation to receive the drive coil;

FIG. 8 is a sectional view taken along line 8—8 in FIG. 5; and

FIG. 9 is an enlarged view of a portion of FIG. 8.

Figure 1:
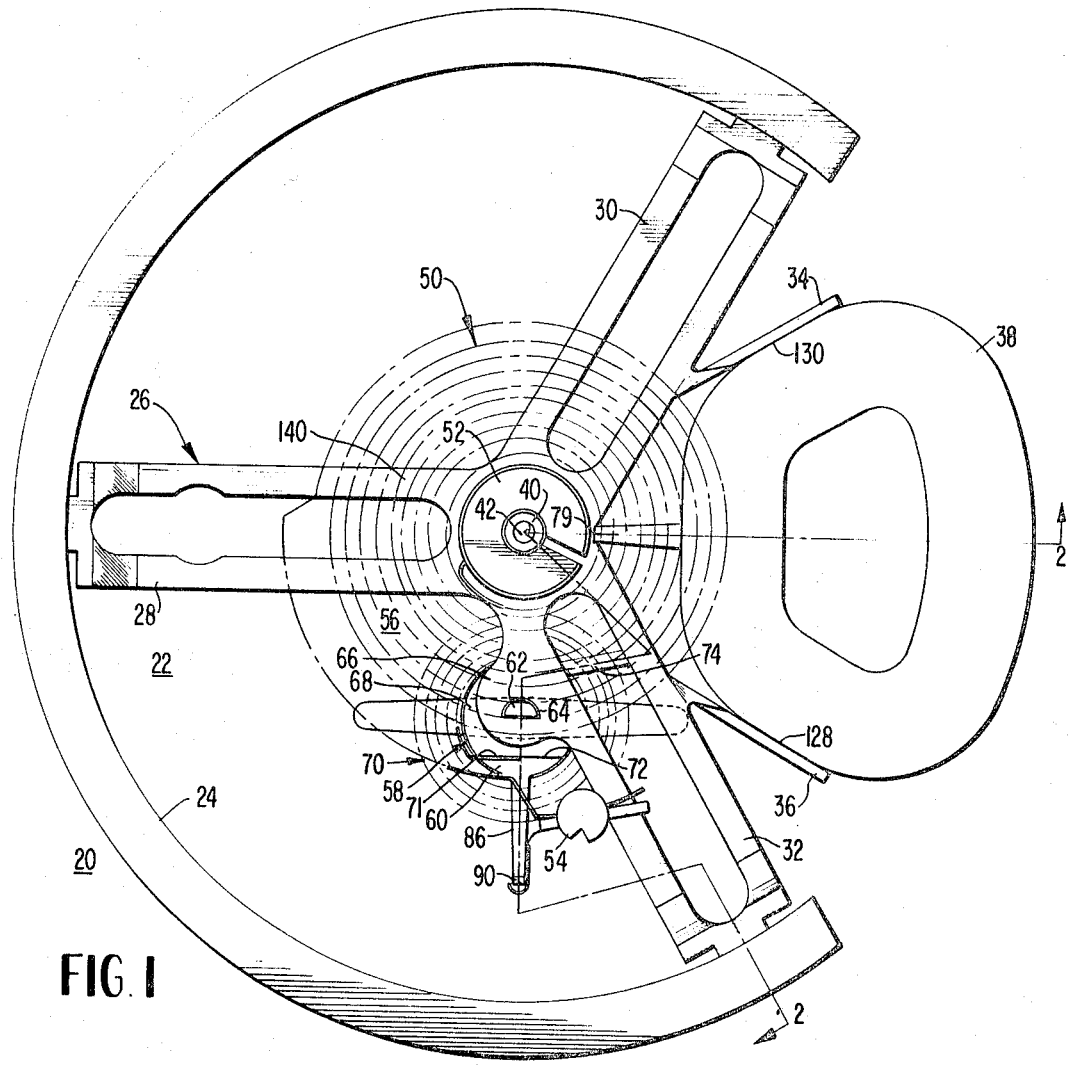
FIG. 1 is a top plan view showing a balance wheel in accordance with this invention, together with a hairspring and a contact system assembly.
Figure 2:
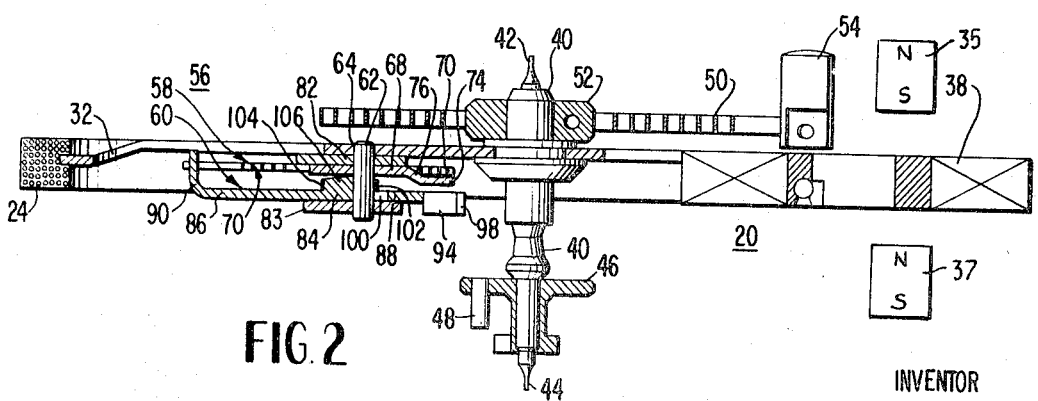
FIG. 2 is a sectional view on line 2—2 of FIG. 1.

With references now to FIGS. 1 and 2, there is shown at 20 an assembled balance and hairspring assembly using the improved balance wheel construction of the present invention. Included are a balance wheel 22 comprised of a rim 24 and an arm 26 having three radial branches or spokes 28, 30 and 32. Attached to the balance wheel 22 by means of a pair of coil mounting tabs 34 and 36 extending from spokes 30 and 32 is a drive coil 38 by which energy is coupled to the balance and hairspring assembly to sustain oscillation.

Balance wheel 22 is mounted on a balance staff 40 having upper and lower ends 42 and 44 supported in conventional fashion within the watch. An indexing mechanism, including a collar 46 and a protruding jewel indexing pin 48, is also mounted in conventional fashion below balance wheel 22 on balance staff 40.

A hairspring 50 is positioned on balance staff 40 directly above balance wheel 22. Hairspring 50 is attached at its inner end to a collar 52 press fitted at the top of balance staff 40. The outer end of hairspring 50 is attached to a hairspring anchor stud 54 fixed relative to the balance and hairspring assembly 20.

As previously explained, in current commercial electric watches, the balance wheel and hairspring usually constitute an electrically driven mechanical oscillator which receives energy to sustain its oscillation from the interaction of a magnetic field of one or more fixed permanent magnets, such as magnets 35 and 37, and a current flowing through drive coil 38. Also, as previously explained, the requirement of low current drain to permit use of a small, long-lasting power source requires that the coil be intermittently energized, i.e., only during those times that the coil is actually within the field of the magnets. This is accomplished by a contact system having a stationary contact and a movable contact attached to the balance wheel and arranged to permit current flow to the coil only during a predetermined portion of the cycle of balance wheel oscillation.

Several contact systems have been developed specifically for this purpose. Such contact systems have been disclosed, for example, in assignee's aforementioned U.S. Reissue Pat. No. Re. 26,187, and in assignee's copending application Ser. No. 695,731 filed Jan. 4, 1968, entitled Contact Index System, in the names of Nathan Cohen, James H. Eckenrode and Donald W. Brashear.

Alternatively, a preloaded contact system, generally denoted at 56 in the drawings herein, may be employed. This contact system is described fully in assignee's copending U.S. patent application Ser. No. 764,266 entitled Preloaded Contact System for Electric Timekeeping Device, filed in the name of James O. LeVan, on even date herewith, the disclosure of which application is fully incorporated by reference herein. Since contact system 56 is the subject matter of the aforementioned copending application, a complete description will not be presented here. However, the essential features of contact system 56 may be appreciated from reference to FIGS. 1–4 and the following description:

As illustrated, contact system 56 comprises an upper contact subassembly 58 and a lower contact subassembly 60. The foregoing are mounted on a D-shaped jewel pin 62 which is press-fitted into an aperture 64 in a semicircular protrusion 66 in branch 32 of balance wheel arm 26.

Upper contact subassembly 58 is comprised of a body portion 68 and a spiral spring 70 formed of a highly conductive material, such as beryllium copper. One end of spring 70 is secured, as by welding at 71, to a vertical flat 72 at the radially outer end of body portion 68. The other end of spring 70 is attached to lower contact subassembly 60 as described more fully hereinafter.

Figure 3:
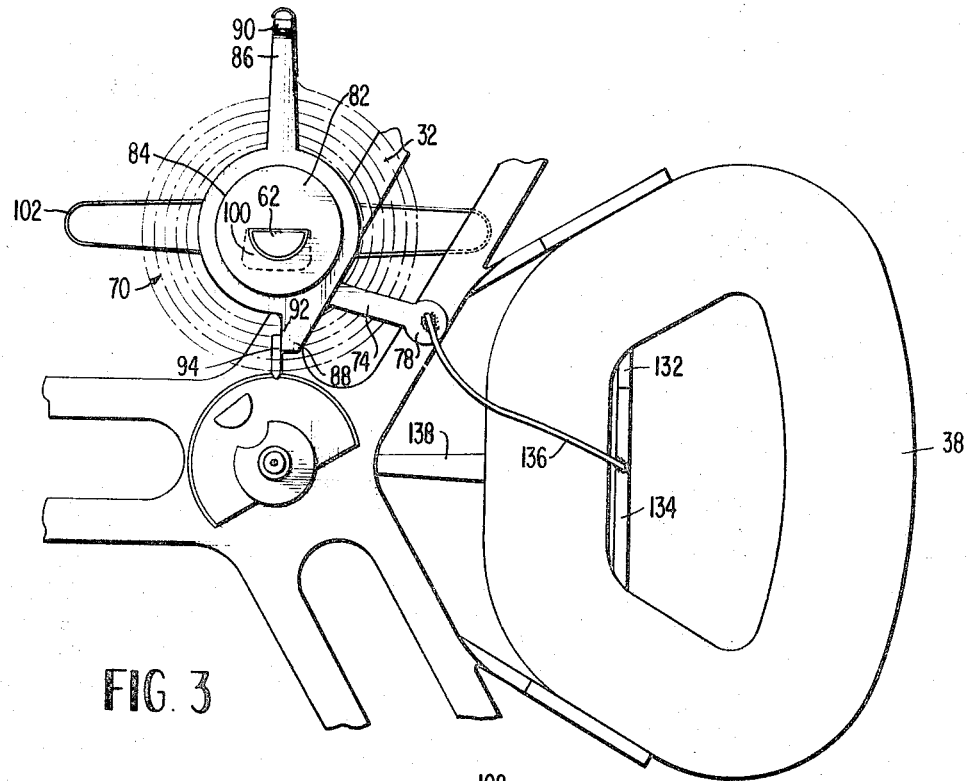
FIG. 3 is a fragmentary bottom view of the contact system assembly and drive coil portion of FIG. 1.
Figure 4:
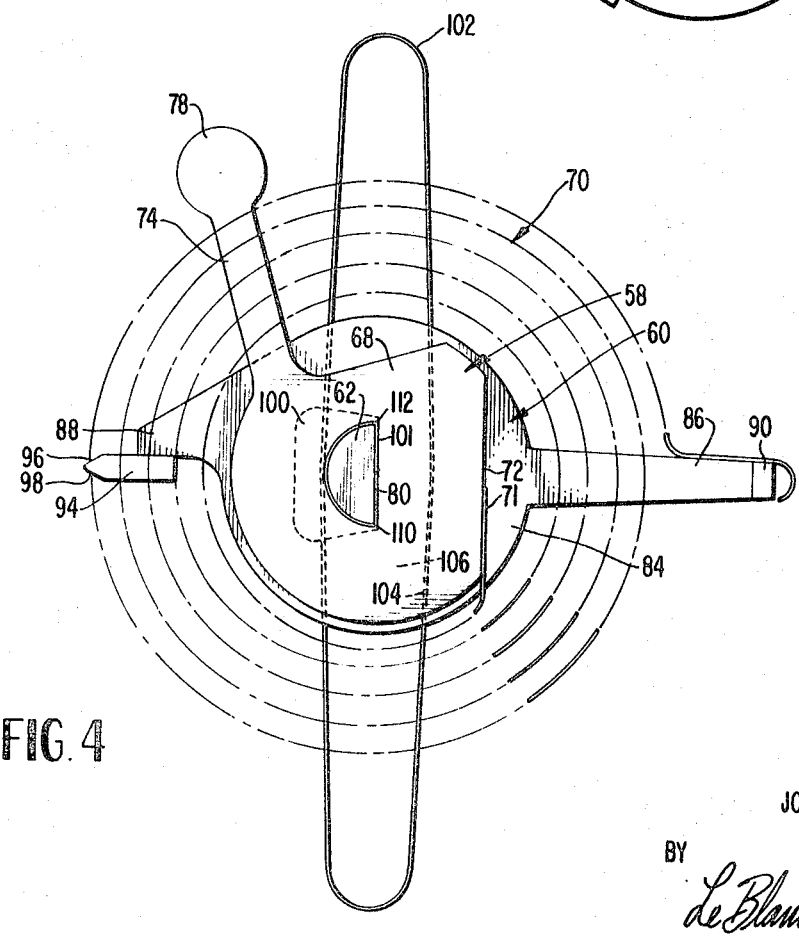
FIG. 4 is a top view of the contact assembly separated from the balance wheel.

As best illustrated in FIGS. 2 and 4, upper contact body portion 68 includes an elongated tail 74 downwardly offset at 76 to provide clearance for conductive spring 70. Tail 74 extends toward drive coil 38 and terminates in a soldering tab 78 which serves as a terminal point for one end of the drive coil. (See FIGS. 2 and 3.) Current return for the drive coil may be provided by direct connection of the other end of the coil to balance wheel arm 26 as shown at 79 in FIG. 1.

As best illustrated in FIG. 2, pin 62 is press-fitted into a central aperture 80 in upper contact body portion 68 to immobilize upper contact subassembly 58 relative to balance wheel 22. An insulating spacer 82 is also mounted on pin 62 directly above body portion 68 to assure electrical isolation between upper contact subassembly 58 and the adjacent portions of branch 32 of balance wheel arm 26.

Positioned beneath upper contact subassembly 58 on pin 62 and resting on a press-fitted retaining washer 83 is lower contact subassembly 60.

Lower contact subassembly 60 (see FIGS. 2 and 3) is formed of beryllium copper or other suitable material and includes a central portion 84 and a pair of diametrically opposed arms 86 and 88 disposed in perpendicular relationship to branch 28 of balance wheel arm 26. Longer arm 86 extends below spiral spring 70 of upper contact subassembly 58 and terminates in an upwardly depending flange 90. The outer end of spiral spring 70 is looped around flange 90 and is welded or soldered to provide a reliable electrical and mechanical connection between upper contact subassembly 58 and lower contact subassembly 60.

Shorter arm 88 of lower contact subassembly 60 includes a flat surface 92 to which is welded or otherwise secured a small rectangular contact plate 94 formed of a gold alloy or other suitable metal. Contact plate 94 is of generally rectangular configuration (see FIGS. 3 and 4) with beveled ends 96 and 98 adapted to engage with a suitable stationary contact assembly described in detail in the aforementioned LeVan application when balance and hairspring assembly 20 oscillates.

In contrast to upper contact subassembly 58, lower contact subassembly 60 is not press fitted onto pin 62 but rather is freely mounted with pin 62 extending through an enlarged generally D-shaped opening 100 in central portion 84. Lower contact subassembly 60 is assembled with the flat surface of pin 62 resting against a flat surface 101 of opening 100 and is retained in place by an elongated endless loop spring 102 bearing against the curved surface of pin 62 and welded along the flat face 104 of a raised shoulder 106 on the side of lower contact central portion 84 opposite the enlarged D-shaped opening 100.

Briefly, in operation, the engagement of contact plate 94 with the aforementioned stationary contact causes a torque on lower contact subassembly 60 about pin 62. Due to enlarged D-shaped opening 100, lower contact subassembly 60 is free to pivot about pin 62, restricted only by elongated spring 102. As a result, when contact plate 94 moves into engagement with the stationary contact, lower contact subassembly 60 alternately pivots about the opposite ends 110 and 112 of the flat surface of jewel pin 62. However, load spring 102 maintains lower contact subassembly 60 properly positioned with respect to jewel pin 62 as it continually applies pressure to the curved surface of pin 62 and the raised shoulder portion 106 of lower contact subassembly 60. In addition, the action of load spring 102 assures a substantially uniform restoring torque on contact plate 94 so that the contact force against the stationary contact remains substantially constant as long as the two members engage each other. This prevents arcing between the contact surfaces, with consequent possible surface damage due to pitting, and also prevents varying electrical contact resistance with consequent variation in the coil current.

With reference now to FIGS. 5 through 9, there is shown in detail the construction of the balance wheel 22 in accordance with the present invention. First, with reference to FIG. 5, balance wheel rim 24 is of generally circular configuration having a segment removed between ends 112 and 114 covering approximately 120° of arc. Arm 26 is formed of a suitable metal such as beryllium copper or other nonmagnetic material and may be photo-etched, for example, by the "Photoforming" process or by any other technique capable of producing a thin member (e.g., about 0.005" in thickness) of relatively complex shape and uniform thickness.

The actual construction of balance arm 26 may best be visualized from reference to FIG. 6 which shows spoke 32 of balance arm 26 before attachment of drive coil 38 and formation of rim 24. As shown, spoke 32 includes an elongated cut-out 116 which serves not only to reduce substantially the weight of arm 26 without derogating from its strength, but also to markedly reduce the generation of undesirable eddy currents in the highly conductive beryllium copper material.

As illustrated in FIGS. 1 and 5, drive coil mounting tab 36 is formed as an extension of balance arm spoke 32. The actual configuration of tab 36 as formed may be seen in FIG. 6. As illustrated, tab 36 includes a stem 118 lying at some suitable angle with respect to the edge 120 of spoke 32 and terminating in an elongated rectangular flag 122 to which drive coil 38 is actually attached. Flag 122 includes a plurality of small apertures 124 to facilitate adherence of the bonding cement by which coil 38 is attached. As will be appreciated, coil mounting tab 34 on balance arm spoke 30 is identical to coil mounting tab 36 except for mirror reversal of flag 122.

As may be seen in FIGS. 6 and 7 balance wheel arm 26 is formed as a flat structure with flag 122 of coil mounting tab 36 in coplanar relationship with spoke 32 and the remainder of the arm. In use, however, a 90° bend is imparted to flag 122 and the corresponding portion of coil mounting tab 34 as indicated in FIG. 7. Then, as illustrated in FIGS. 1 and 3, drive coil 38 is mounted between tabs 34 and 36 with a pair of elongated flat surfaces 128 and 130 bearing against flag face 126 and the corresponding face of tab 34.

The actual construction of coil 38, as well as a suitable technique for the manufacture thereof, is the subject of assignee's copending U.S. application Ser. No. 696,854, filed Jan. 10, 1968, in the name of James O. LeVan, the disclosure of which is incorporated herein by reference. For present purposes, it should simply be noted that coil 38 is mounted in the manner previously described and that the inner end 132 (see FIG. 3) is attached to a rod 134 formed for example, of a suitable gold alloy, embedded in coil 38 during fabrication. Rod 134 in turn is connected by means of a wire 136 to soldering tab 78 at the end of tail 74 on upper contact body portion 68. The other end of coil 38 is connected by means of a contact strip 138 to the central hub portion 140 of balance arm 22.

As shown in FIG. 6, balance arm spoke 32 (and correspondingly, spokes 28 and 30 as well) terminates in a small rectangular protrusion 142 which serves as a mounting tab by which balance arm 26 is molded into rim 24 at the time of manufacture. As illustrated in FIGS. 5 and 8, the portions of spokes 28, 30, and 32 adjacent to rim mounting tabs 142 are bent at 144 and 146 to offset mounting tabs at 142 downwardly below the plane of the balance wheel arm. This permits embedding of tabs 142 well within the body of rim 22 to assure permanent and secure attachment of arm 22 to rim 24.

As previously noted, a basic significant feature of the present invention is the provision of a balance wheel characterized by a low eddy current loss while retaining the other features which have been found necessary and advantageous for successful balance wheel operation. The actual structure by which the foregoing feature is achieved may be understood from FIG. 8 which shows a cross sectional view of balance wheel rim 24 and from FIG. 9 which shows a greatly enlarged view of a small portion of the cross section of FIG. 8.

As illustrated, balance wheel rim 24 is formed of a plurality of turns of wire wound into an annular coil with rim mounting tabs 142 within the radially inner face 148. Rim 24 is formed of a plurality of concentric cylindrical layers extending radially a sufficient distance to provide the desired annular width. As may be appreciated, an approximately square cross section, as shown in FIG. 8, is achieved by providing an equal number of turns in the axial and radial directions. However, other cross-sectional configurations, e.g., rectangular, eliptical, circular, etc. would be achieved by adjusting the number of axial windings in each radial layer. However, the square configuration or a rectangular configuration is preferred both for reasons of simplicity and most satisfactory weight distribution relative to available space.

As illustrated in FIG. 9, each of the windings 150 comprises a central wire core 152 surrounded by an annular insulating sheath 154. The wire and its insulating coating are embedded in a matrix 156 formed of a resinous material such as epoxy or any other suitable nonconductive and non-magnetic material capable of bonding the plurality of turns 150 into a solid rigid mass.

As previously noted, it has been found that careful consideration of the mechanical and physical properties of the materials used in the formation of balance wheel 22 generally and rim 24 in particular is essential to achieve the desired objectives of low eddy current loss, desirably high moment of inertia to mass ratio and other features necessary for satisfactory operation. In particular, it has been found that the materials used in the manufacture of balance wheel rim 24 should have the following properties:

(1) The density of the wire comprising wire core 152 should be at least about 12 grams per cubic centimeter and preferably at least about 18 grams per cubic centimeter.

(2) The composite balance wheel should possess a net minimum density on the order of about 6.0 grams per cubic centimeter, and preferably at least about 9 grams per cubic centimeter.

Fulfillment of conclusions (1) and (2) assures that the completed balance wheel can be constructed with the desirable high moment of inertia to mass ratio without excessive annular width and axial thickness.

(3) The material comprising wire core 152 should have (a) tensile strength of at least about 30,000 p.s.i. and preferably at least about 400,000 p.s.i.; (b) hardness of at least about F40 Rockwell; and (c) a magnetic impurity content, i.e., iron and nickel, not exceeding about 0.02% by weight.

(4) As previously noted, wire core 152 should be coated with an insulating film 154. Satisfactory results can be achieved with an insulating film coating of polyurethane having a thickness of at least about 10 microinches.

(5) In order to achieve best results as to void-free winding of wire core 152 into the resinous matrix 156, the total diameter of the wire including insulation should be less than 5 mils. However, to facilitate handling, it has been found that a wire diameter including insulation substantially less than about 1 mil should be avoided.

In fulfillment of requirements (1) through (5), several materials have been found to be satisfactory. However, for various practical and technical reasons, best results are achieved using the pure annealed tungsten wire of approximately 0.78 mil diameter coated with Solvar (polyurethane insulating coating) having a thickness of approximately 0.12 mil.

(6) The number of turns of the foregoing tungsten wire used in rim 24 as well as various physical and chemical characteristics of the resinous binder constituting matrix 156 should be selected in order to assure that the composite balance wheel including arm 26 will have (a) a density exceeding approximately 6 grams per cubic centimeter, and preferably exceeding about 9 grams per cubic centimeter, and (b) a moment of inertia to mass ratio of at least about 1:10; (c) water absorption for the resinous matrix should be less than or equal to about 0.1% by weight; (d) the coefficient of thermal expansion for the composite balance wheel and arm should closely match that of the material selected for fabrication of hairspring 50.

For example, for a hairspring constructed of Elinvar Extra, the coefficient of thermal expansion of resinous matrix 156 should be on the order of approximately $9 \times 10^{-6}$–$10 \times 10^{-6}$ inches per inch per degree F. In addition, to assure long term reliability during use, the composite balance wheel construction should be able to withstand approximately 2000 g. shock without permanent deformation.

In light of the foregoing, excellent results have been achieved using a balance wheel constructed of approximately 500±5 turns of the aforementioned tungsten wire wound into an annular coil having internal diameter of about 0.202 inch, an outside diameter of about 0.225 inch, an annular width of about 0.023 inch and an axial thickness of about 0.022 inch. Under those circumstances, the resinous binder may be any one of a number of commercially available epoxy resins. For example, satisfactory results can be achieved using a 50–50 mixture of Epi-Rez No. 504 and Epi-Rez No. 510 and 22 parts Epi-Cure hardener, all available from the Celanese Coatings Company, Louisville, Ky. However, other resinous binders and rim dimensions resulting in a composite balance wheel meeting the aforementioned criteria (1) through (6) may be substituted.

Referring again to FIG. 8, it will be appreciated that the configuration and placement of rim mounting tab 142 is a significant factor in achieving a rigid and reliable balance wheel construction. In this regard, good results are achieved with a tab 142 having a radial dimension of approximately 10 mils, a tangential dimension of approximately 20 mils, an axial dimension (i.e., thickness) of approximately 5 mils. As indicated in FIG. 8, tab 142 should be vertically offset so that its upper surface 158 is approximately 7 mils below the upper surface 160 of coil 24, and should have a portion embedded within coil 24 a distance of about 5 mils.

The wire wound balance wheel assembly 22 of this invention can be formed in any suitable manner consistent with the requirements set forth herein. One satisfactory technique is to form arm 26 to the proper configuration, with coil mounting tabs 34 and 36 and arm branches 28, 30, and 32 prebent to the proper configurations and then to mount balance arm 26 in a winding arbor. Insulated wire 150 (see FIG. 9) is precoated with liquid epoxy resin and wound onto the arbor. Wire 150 may be dipped in a reservoir of thick epoxy which is retained on the wire during winding, and which then flows together to form the solid matrix 156 as the coil is wound. Alternatively, wire 150 may be passed over an applicator wheel or any other equivalent means of applying the relatively thick coating of the liquid resinous material.

As will be appreciated, the inside diameter of rim 24 is determined by the winding arbor upon which the rim is wound. However, the outside diameter must be independently controlled. This is done by adding a quantity of epoxy to the periphery of the rim after it has been wound to form a "tire" of the binder material which may be ground after curing to the desired final outside diameter. This has the additional advantage of protecting the outer windings from abrasion or other possible damage both during subsequent manufacturing and handling steps.

In order to complete the balance wheel, the segment between ends 122 and 114 (see FIG. 5) must be removed, e.g., by sawing through rim 24 at the desired locations. However, it has been found that successful curing of the epoxy matirx 156 requires an initial heat treatment before the rim is cut. Suitable heat treatment can be accomplished at a temperature of approximately 175° C. (350° F.) for a period of time of approximately 1.50 hours.

Following the heat tretament, the unwanted rim section is removed, e.g., by sawing through a pair of appropriately placed slots in the arbor assembly.

At this point, the final heat treatment is desirable in order to reset the rim and to prevent bowing of arm 26 due to release of tension in the circuit rim after cutting. Good results are obtained with a final cure for approximately 2 hours at 175° C.

Upon completion of the second heat treatment step, the winding arbor may be disassemled and the balance wheel removed, preparatory to attachment of drive coil 38.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency are therefore intended to be embraced therein.

What is claimed and desired to be secured by United States Letters Patent is:

1. A balance wheel for an electric timekeeping device having good resistance to generation of eddy currents due to passage of said balance wheel through a magnetic field, said balance wheel comprising: an arm having at least two radially extending spokes; and a generally circular rim mounted on said arm; said rim being formed of a plurality of segments of an electrically conductive material embedded in a matrix of electrically nonconductive, nonmagnetic resinous material.

2. A balance wheel as defined in claim 1 wherein said rim is formed of a plurality of metal wires embedded in an epoxy matrix.

3. A balance wheel as defined in claim 1 wherein said rim is formed of a coil of wire embedded in said resinous matrix; said coil being cut radially and a segment thereof removed so that each turn of said coil constitutes an open loop electrically isolated from each of the other turns.

4. A balance wheel as defined in claim 3 wherein said coil is formed of annealed tungsten wire having a polyurethane coating as electrical insulation, said coil being embedded in an epoxy binder cured to form a rigid self-supporting structure.

5. A balance wheel as defined in claim 4 wherein each of said spokes includes a radially projecting tab at its end embedded in said epoxy matrix between the turns of said coil of wire.

6. A balance wheel as defined in claim 1 wherein said arm includes means for attaching a drive coil for said balance wheel.

7. A balance wheel as defined in claim 1 wherein said conductive material is comprised of a coil of insulated electrically conducting wire having a density of at least about 12 grams per cubic centimeter; a tensile strength of at least about 30,000 p.s.i., and a magnetic metal content not exceeding about 0.02 percent by weight.

8. A balance wheel as defined in claim 7 wherein said wire has a density of at least about 18 grams per cubic centimeter; a tensile strength of at least about 400,000; and a hardness of at least about F40 Rockwell.

9. A balance wheel as defined in claim 7 having a composite density of at least about 6 grams per cubic centimeter and an overall moment of inertia to mass ratio of at least about 1:10.

10. A balance wheel as defined in claim 9 having a water absorption in the resinous matrix of less than about 0.1 percent by weight; and a coefficient of thermal expansion of between about $9 \times 10^{-6}$ and about $10 \times 10^{-6}$ inches per inch per degree Fahrenheit.

11. A balance wheel as defined in claim 10 wherein said wire has a density of at least about 18 grams per cubic centimeter, tensile strength of at least about 400,000, a hardness of at least about F40 Rockwell; and wherein the density of the composite balance wheel is at least about 9 grams per cubic centimeter.

12. A balance wheel as defined in claim 1 wherein said rim is formed of a plurality of concentric open loops of electrically conductive wire, isolated from each other by an insulating coating and by said nonconductive matrix; the diameter of said wire, including the insulating coating, being between one and five mils; said wire having a density of at least about 18 grams per cubic centimeter, a tensile strength of at least about 400,000 p.s.i., a hardness of at least about F40 Rockwell and a magnetic metal content not exceeding about 0.02 percent.

13. A balance wheel as defined in claim 12 having a composite density of at least about 9 grams per cubic centimeter, a water absorption in the resinous matrix not exceeding about 0.1 percent by weight, a coefficient of thermal expansion of between about $9 \times 10^{-6}$ and $10 \times 10^{-6}$ inches per inch per degree Fahrenheit, and an overall moment of inertia to mass ratio of at least about 1:10.

14. A balance wheel as defined in claim 1 further including a drive coil for said electric timepiece mounted on said arm near the periphery of said balance wheel; a segment of said generally circular rim being removed and said drive coil being partially situated in the area vacated by removal of said segment.

15. A balance wheel as defined in claim 14 wherein said arm includes three equally spaced radial spokes; each of said spokes including a radial extension received within said matrix of nonconductive material for securing said arm to said rim; two of said spokes including tabs projecting therefrom intermediate the center and ends for mounting said drive coil in the desired position relative to said balance wheel rim.

16. A balance wheel as defined in claim 15 wherein said open loops of electrically conductive wire are formed of tungsten coated with a layer of polyurethane insulation, the total diameter of the wire and insulation being between one and five mils; wherein said matrix of nonconductive resinous material is formed of epoxy resin; and wherein the composite balance wheel has a density of at least about 9 grams per cubic centimeter, a water absorption in the resinous matrix not exceeding about 0.1 percent by weight; a coefficient of thermal expansion between $9 \times 10^{-6}$ and $10 \times 10^{-6}$ inches per inch per degree Fahrenheit and a moment of inertia to mass ratio of at least about 1:10.

17. A method of manufacturing a balance wheel for an electric timekeeping device to minimize the effects of eddy current generation therein during operation, said method comprising: forming a balance wheel arm with at least two radial spokes; mounting said arm in a bobbin with the outer ends of said spokes projecting through the bobbin wall; precoating a length of insulated electric wire with a liquid resinous binder material; winding said precoated wire into a coil on said bobbin so that the projecting outer ends of said arm are embedded in said coil; and curing said resinous binder to form a solid self-supporting structure having said coil of wire and said ends of said arm embedded therein.

18. A method of manufacturing a balance wheel as defined in claim 17 wherein the curing of said resinous binder is accomplished by a first heat treatment for about 1.50 hours at approximately 350 degrees Fahrenheit and a second heat treatment for approximately 2 hours at 350 degrees Fahrenheit.

19. A method of manufacturing a balance wheel as defined in claim 18 further including the steps of removing a segment of said balance wheel rim by cutting said rim through a pair of spaced slots in said bobbin; said removal taking place between said first and second heat treatments; and further including the step of removing said balance wheel from said bobbin after said second heat treatment by disassembly of said bobbin.

20. A method of manufacturing a balance wheel as defined in claim 17 further including the steps of coating the radially outer surface of said wound rim before curing with an additional layer of said resinous binder and removing a portion of said layer after curing to establish the desired outside rim diameter for said balance wheel.

21. A method of manufacturing a balance wheel as defined in claim 17 wherein said wire is characterized by a density of at least about 12 grams per cubic centimeter, by a tensile strength of at least about 30,000 p.s.i., by a hardness of at least about F40 Rockwell, and by a magnetic metal content not exceeding about 0.02 percent by weight; with the wire diameter, including insulation, being between about one and five mils.

22. A method of manufacturing a balance wheel as defined in claim 21 wherein the density of said wire is at least about 18 grams per cubic centimeter; and wherein said tensile strength is at least about 400,000 p.s.i.

23. A method of manufacturing a balance wheel as defined in claim 21 wherein the composition and dimensions of said arm and rim materials are so chosen that the composite balance wheel density is at least about 6 grams per cubic centimeter, the moment of inertia to mass ratio is at least about 1:10, and the total water absorption in the resinous matrix for said balance wheel is less than about 0.1 percent by weight.

24. A method of manufacturing a balance wheel as defined in claim 23 wherein the coefficient of thermal expansion of said resinous binder material is chosen to be between about $9 \times 10^{-6}$ and $10 \times 10^{-6}$ inches per inch per degree Fahrenheit, and where the density of said composite balance wheel is at least about 9 grams per cubic centimeter.

25. A method of manufacturing a balance wheel as defined in claim 24 wherein said curing includes an initial heat treatment to partially cure said rim; and a second heat treatment to fully cure said resinous binder; and wherein said method further comprises the steps of removing a segment of said balance wheel rim after said first heat treatment by cutting said rim through a pair of spaced slots in said bobbin; and removal of said cured balance wheel from said bobbin by disassembly thereof after said second heat treatment.

26. A method of manufacturing a balance wheel as defined in claim 25 wherein said initial heat treatment is carried out at a temperature of about 350 degrees Fahrenheit for about 1.50 hours; and wherein said second heat treatment step is carried out at 350 degrees Fahrenheit for about 2 hours.

References Cited
UNITED STATES PATENTS 2,953,896  9/1960  Van Horn et al. _____ 58—28

RICHARD B. WILKINSON, Primary Examiner

E. C. SIMMONS, Assistant Examiner

U.S. Cl. X.R.

29—592; 58—107; 310—36